United States Patent [19]

Hessel et al.

[11] 4,040,515  
[45] * Aug. 9, 1977

[54] CHEMICAL DISPENSING APPARATUS

[75] Inventors: Harold H. Hessel, Briarcliff Manor; Francis S. Kiele, Pleasantville, both of N.Y.

[73] Assignee: Stewart-Hall Chemical Co., Mount Vernon, N.Y.

[*] Notice: The portion of the term of this patent subsequent to Aug. 28, 1990, has been disclaimed.

[21] Appl. No.: 350,192

[22] Filed: Apr. 11, 1973

Related U.S. Application Data

[63] Continuation-in-part of Ser. No. 108,774, Jan. 22, 1971, Pat. No. 3,754,871.

[51] Int. Cl.² .................. A23F 1/08; B65D 81/74; B01D 59/22
[52] U.S. Cl. ................................ 206/.5; 206/484; 206/205; 23/267 A; 210/242 R
[58] Field of Search .................... 4/226, 228-231; 23/267 A; 206/.5, 42, 84, 205, 484; 210/242, 484; 239/56; 426/77

[56] References Cited

U.S. PATENT DOCUMENTS

| 3,340,069 | 2/1967 | Palmer, Sr. | 206/.5 |
| 3,431,569 | 3/1969 | Gerke | 206/.5 |
| 3,694,354 | 9/1972 | Nolte, Jr. | 23/267 A |
| 3,754,871 | 8/1973 | Hessel et al. | 23/267 A |

FOREIGN PATENT DOCUMENTS

| 597,299 | 1/1948 | United Kingdom | 206/.5 |

Primary Examiner—George E. Lowrance  
Assistant Examiner—Douglas B. Farrow  
Attorney, Agent, or Firm—Darby & Darby

[57] ABSTRACT

A simplified chemical dispenser apparatus capable of dispensing a predetermined amount of a treatment chemical into a fluid includes a porous matrix exhibiting capillary action when the fluid contacts a surface of the matrix, a fluid treatment chemical composition located on a surface of the matrix, and housing means for covering said chemical composition and at least said chemical bearing matrix surface to shield against dripping or splashing from the top or sides. The housing may be applied as an envelope in which case the chemical supported upon the matrix is sealed therein.

15 Claims, 10 Drawing Figures

INVENTORS
HAROLD H. HESSEL
FRANCIS S. KIELE

Darby + Darby

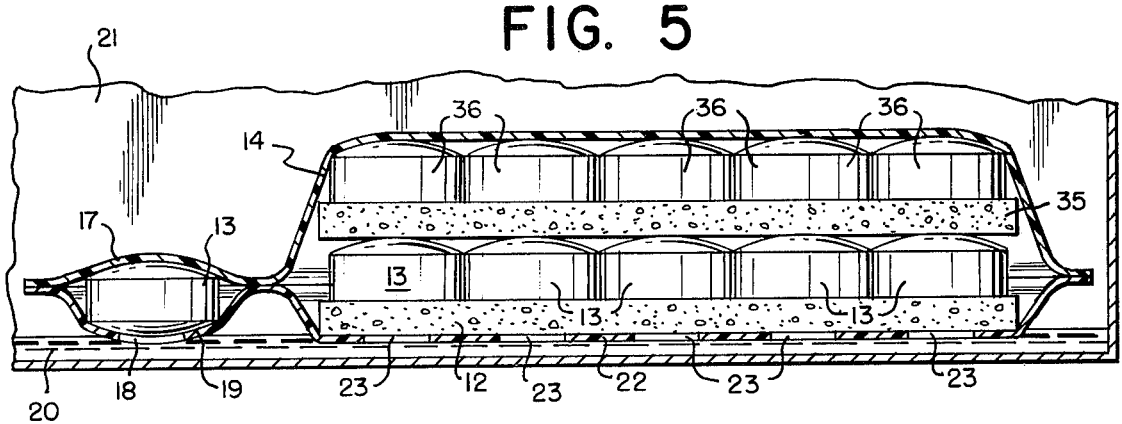
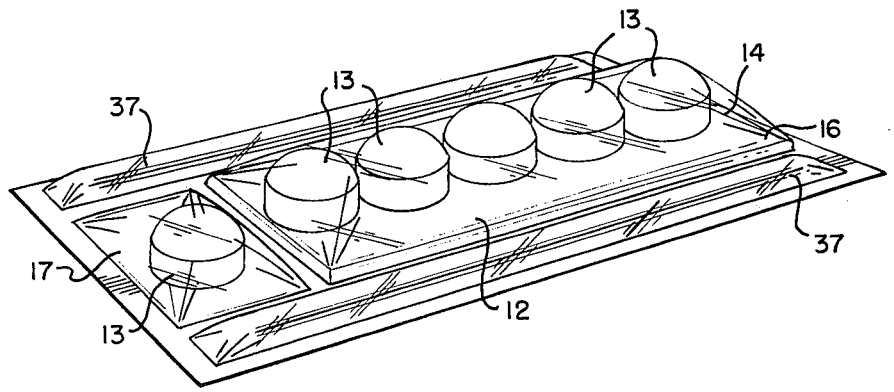

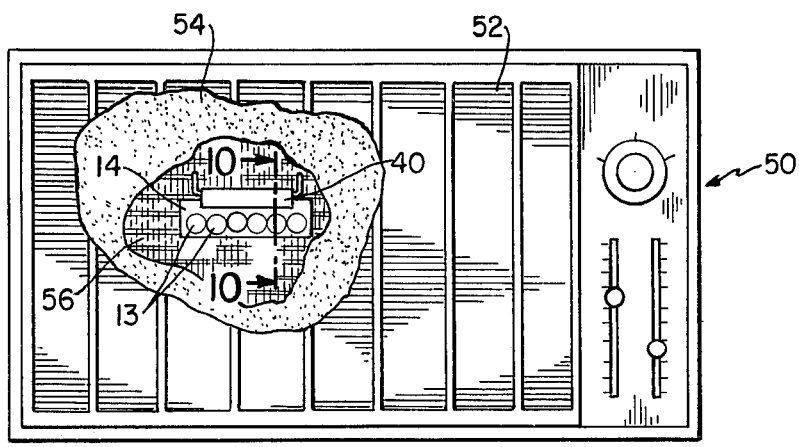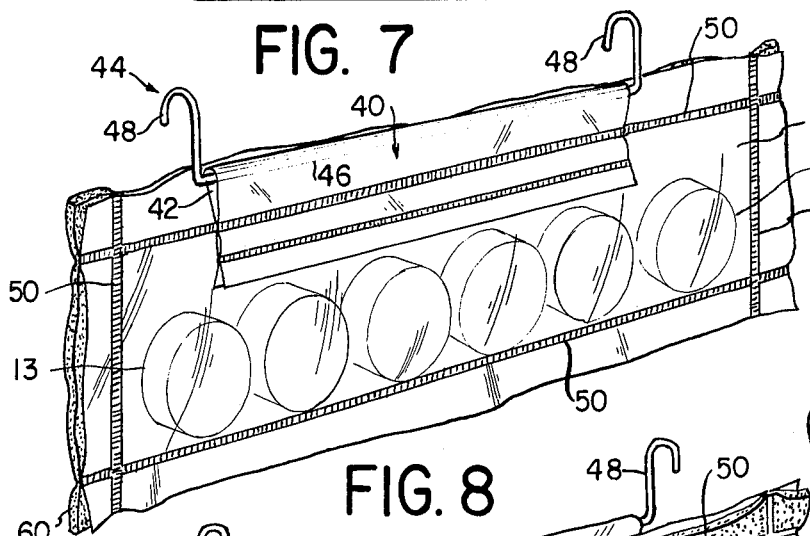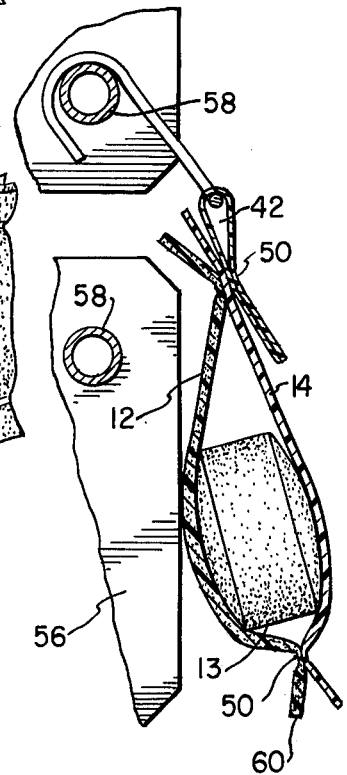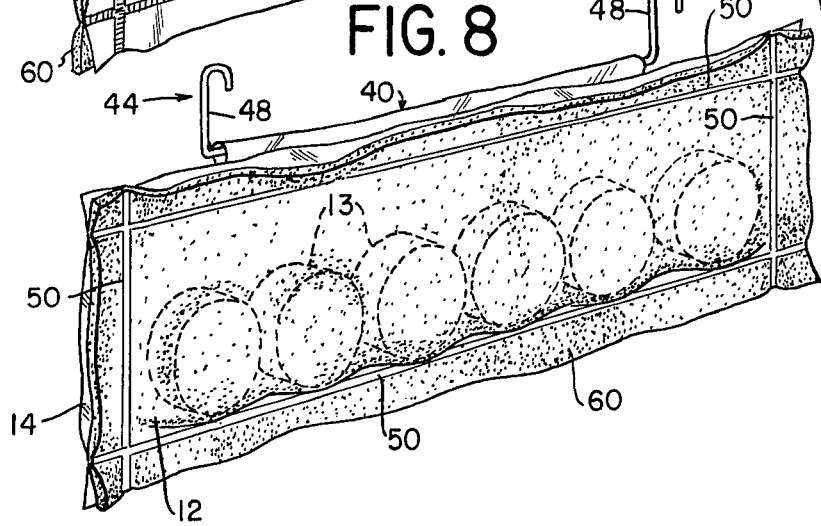

CHEMICAL DISPENSING APPARATUS

This copending application is a continuation-in-part of application Ser. No. 108,774 filed Jan. 22, 1971, now U.S. Pat. No. 3,754,871.

This invention relates to chemical dispenser devices and more specifically to a dispenser capable of dispensing chemicals at a predetermined rate into both aqueous and non-aqueous fluids.

Still more specifically, this invention relates to a dispenser for use in both recirculating and once-through fluid systems. In particular, this invention relates to a chemical dispenser apparatus useful for treating condensate water in fan coil air-conditioning equipment.

Although a variety of chemical dispensing devices are currently available, they are all relatively expensive and may require a technically trained person to install, maintain, adjust and calibrate them. With the increasing use of more sophisticated water and fluid treatment equipment at both the consumer and commercial level, the need for inexpensive, easy-to-use, apparatus for dispensing fluid treatment chemicals has become apparent. A consumer, having no technical know-how, requires extremely simple chemical dispensing equipment to properly meter treatment chemicals into his air conditioner, humidifier, fuel oil tank and a variety of other common household appliances. Although the commercial and industrial organization requiring chemical treatment apparatus can generally afford more complex equipment, they are often plagued by the lack of properly qualified personnel and therefore require a simple, low-cost, dependable device capable of metering chemicals into their more complex fluid systems for extended periods of time.

Both the industrial and general consumer require a simple and reliable chemical dispensing apparatus for releasing predetermined amounts of chemical treatment compositions into both aqueous and non-aqueous fluids over protracted time periods. Ideally, this device will not require follow-up maintenance or attention.

A dispenser device is essential, since chemicals placed directly into the system would be consumed too rapidly or would not function properly. The intended purpose of these chemical treatment compositions is to ensure economical and trouble-free operation of the equipment and system into which it is introduced and further to improve the overall performance of the related equipment and system. Such systems may have comparatively large access space for a dispenser as in the case of industrial-type equipment, or as in the case of a home air conditioner may require a miniature dispenser apparatus. In addition, the system may require that an aqueous or non-aqueous fluid be treated either in bulk form in a tank or sump or simply as it passes rapidly over a surface upon which there is no appreciable fluid build-up.

A suitable chemical dispenser apparatus must be capable of dispensing either a single chemical composition or a plurality of chemical compositions into a system in simultaneous or sequential fashion, as well as allowing treatment with either a single chemical or a mixture or composition of several chemicals. It is generally desirable to meter these chemical treatment compositions into the fluid system from a single source in a designated sequence to meet the needs of the respective system and avoid the need for a plurality of dispensing devices. The fluid systems with which such a chemical dispenser apparatus may be used include inter alia air and water-cooled air conditions, humidifiers, fountains, pools, fish tanks, drainage systems, boilers and fuel oil-burning systems. Among the chemical compositions which may be metered into the above-mentioned systems using the apparatus of this invention are corrosion inhibitors, slimicides, fungicides, deodorants, water treatment chemicals (e.g., water softeners) fuel oil additives and the like whose chemical compositions are well known in the trade.

It is an object of this invention to provide a chemical dispenser apparatus capable of dispensing a treatment chemical into both aqueous and non-aqueous fluids.

It is another object of this invention to provide a chemical dispenser apparatus capable of dispensing a predetermined amount of a chemical composition into a fluid system over an extended period of time.

A further object of this invention is to provide a chemical dispenser apparatus capable of dispensing at least one treatment chemical into a fluid system at a variable rate in relation to the fluid content of the system.

A further object of this invention is to provide a chemical dispenser apparatus for use in both recirculating and once-through fluid systems.

A still further object of this invention is to provide a low-cost chemical dispenser apparatus requiring no maintenance or initial mechanical set-up and which requires a minimum of space for operation.

To achieve these and other objects, the present invention provides a simplified chemical dispenser apparatus which comprises a capillary matrix exhibiting capillary action when a surface area of said matrix is brought into contact with a fluid, a dissolvable chemical composition positioned on a surface of said matrix, and housing means providing a fluid impermeable cover over at least said chemical composition and said matrix surface.

This invention including the above-mentioned and further objects and advantages thereof will be better understood in connection with the following specification and drawings, wherein:

FIG. 5 is a longitudinal cross-sectional view of a two-stage chemical dispenser apparatus in accordance with this invention.

FIG. 6 is a perspective view of the chemical dispenser apparatus of FIG. 3, including a flotation collar.

FIG. 7 is a front perspective view of another embodiment of the chemical feeder apparatus of this invention including a hanger apparatus.

FIG. 8 is a rear perspective view of the chemical feeder apparatus of FIG. 7.

FIG. 9 is a front elevational view of a room air conditioner with parts cut away to illustrate the installation of the embodiment of FIG. 7.

FIG. 10 is a cross-sectional view along the lines 10—10 of FIG. 9 illustrating in greater detail the installation of the chemical feeder apparatus of FIG. 7 in a room air conditioner.

Figure 1:
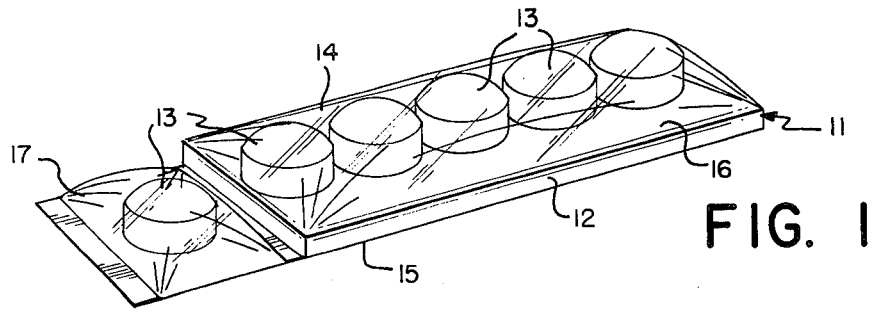
FIG. 1 is a perspective view of one form of the chemical dispenser apparatus of this invention.

Referring now to FIG. 1, a chemical dispenser apparatus 11 is there generally illustrated in perspective view. The chemical dispenser apparatus 11 of this invention can generally be considered as comprised of three principal elements: a capillary matrix or base 12, a fluid-treatment chemical composition 13, and a housing or jacket 14. The capillary matrix or base 12 acts as a support and treatment surface for the fluid-treatment chemical composition 13. The capillary matrix 12 consists of a porous material which exhibits capillary action when a surface of the matrix is contacted by a liquid. The capillary action generally causes a liquid contacting a surface of the capillary matrix 12 to permeate and ascend through the matrix. The inherent capillary activity of the material of which the capillary matrix 12 is fabricated, as well as the thickness and density of the capillary matrix itself, will largely determine the rate at which a liquid contacting the lower surface 15 of the capillary matrix will ascend through the matrix and wet the fluid-treatment chemical composition 13 resting on an upper surface 16 of capillary matrix 12.

The materials from which the capillary matrix 12 may be fabricated include inter alia such materials as reticulated plastic or latex foam, non-woven or woven fabrics, metallic or plastic mesh, sintered metallic materials, or any other materials which possess sufficient capillary activity to enable a liquid contacting the material to ascend through the material. A porous polyurethane foam composition is the preferred matrix material due to its stable properties in a wide variety of fluids. The thickness of a given capillary matrix may vary from a given thickness to zero within the same chemical dispenser apparatus. For example, the thickness of capillary matrix 12 may be tapered o formed of adjacent matrix elements of differing thicknesses.

The fluid-treatment chemical composition 13 may be any of a variety of simple or complex materials in any suitable dissolvable form, such as in the form of a tablet, pill, capsule, briquette, powder, granule, crystal, slug or pellet. In some cases, it may be advantageous to utilize an encapsulated liquid or paste. The exact composition of the fluid-treatment chemical will depend upon the particular chemical system in which it is to be used and the treatment which it is desired to effect.

Generally, the chemical composition of the fluid-treatment chemical composition 13 is selected or prepared so that it will dissolve upon contact with a specific fluid known to be present in the system to be treated, after the fluid has ascended through the capillary matrix 12 to make contact with the chemical composition. The solubility, as well as the density, of the fluid-treatment chemical composition 13 in the particular fluid or solvent used, will generally determine the relative speed at which the particular composition forming the solute may be metered back down the capillary matrix into the fluid system. Fluid-treatment compositions useful in the present invention include inter alia corrosion inhibitors, anti-bacterial agents, deodorants, water softeners, slimicides, fungicides, detergents, fuel oil additives, and algaecides, whose composition is well known in the trade.

In a preferred embodiment shown in FIG. 1, the fluid-treatment chemical composition 13 is provided in tablet form and is held in a pocket formed between housing 14 and the upper surface 16 of capillary matrix 12. The housing 14 is fabricated from a suitable fluid-impermeable material selected on the basis of the particular system in which the chemical dispenser apparatus 11 is to be employed. The housing 14 serves to hold the fluid-treatment chemical composition 13 in place on the upper surface 16 of capillary matrix 12, and additionally prevents inadvertent dissolution of the chemical composition due to dripping or splashing of fluid onto the top or sides. The housing may be made of one or more thicknesses of a flexible or rigid material, composed inter alia of polyethylene, polyvinyl chloride, polyvinyl acetate, nylon, saran, Teflon, polystyrene, epoxy, or other suitable plastic films, rubbers, sheet metal, molded plastics, or a variety of other suitable fluid-impregnable materials.

A portion of the fluid-treatment chemical composition 13 (generally a single tablet or briquette) may rest within a separate compartment 17 formed of the same material as housing 14. The separate compartment 17 is completely fluid-tight except for one or more small apertures 18 in the floor 19 of the compartment. The portion of the fluid-treatment chemical composition 13 held within separate compartment 17 rests directly on the perforated floor 19 of the compartment and not on a capillary matrix (see FIG. 2). In this manner, the desired chemical treatment will be initiated rapidly upon insertion of the chemical dispenser into a fluid system due to the immediate contact between the fluid-treatment chemical composition and the fluid 20 which is to be treated by way of the aperture or apertures 18. The separate compartment 17 may be integrally joined or fastened in any suitable fashion to housing 14.

The rate at which chemical composition 13 illustrated in FIG. 1 is dispensed into fluid 20 is governed by the capillary activity of capillary matrix 12 (i.e., the rate at which fluid 20 is drawn up into the matrix), and the solubility of chemical composition 13 in fluid 20, as well as the thickness of the capillary matrix 13.

Fluid 20 is drawn up through matrix 12 to dissolve a portion of chemical composition 13 (the amount of chemical dissolved being dependent on the quantity of fluid drawn up through matrix 12 by capillary activity). The dissolved chemical composition then diffuses down through capillary matrix 12 to the point where the main body of water being treated physically wipes the chemical from the bottom of the pad. The rate at which the treatment chemical 13 is dissolved and dispensed into fluid 20 can be slowed by increasing the thickness of capillary matrix 12; selecting a fluid treatment chemical composition 13 which is less soluble in fluid 20; by selecting a matrix material 12 displaying less capillary activity or any combination of the foregoing techniques.

Referring again to FIG. 2, it will be seen that the housing 14 has been secured to the outer margins of capillary matrix 12 by using a suitable adhesive. Chemical dispenser apparatus 11 is illustrated as placed in the condensate fluid 20 from a fan coil air conditioner (not shown) which has collected in a drip tray 21. The chemical composition 13 illustrated in the preferred tablet form, may be a compounded algaecide, slimicide, deodorant, corrosion control chemical and scale control chemical. The illustrated chemical dispenser apparatus will begin dispensing the fluid-treatment chemical composition 13 as soon as it is placed into drip tray 21 with the capillary matrix 12 contacting the floor of drip tray 21. This embodiment of the chemical dispenser apparatus permits relatively rapid treatment of the fluid 20 with a large dose of the fluid-treatment chemical composition 13 since the entire lower surface 15 of capillary matrix 12 is in contact with fluid 20 and substantially the entire capillary matrix will conduct the condensate fluid 20 up to the fluid-treatment composition 13 resting on the upper surface 16 of the capillary matrix 12. In addition, treatment is begun at once by direct exposure of tablet 17 to fluid 20 by way of aperture(s) 18.

Figure 3:
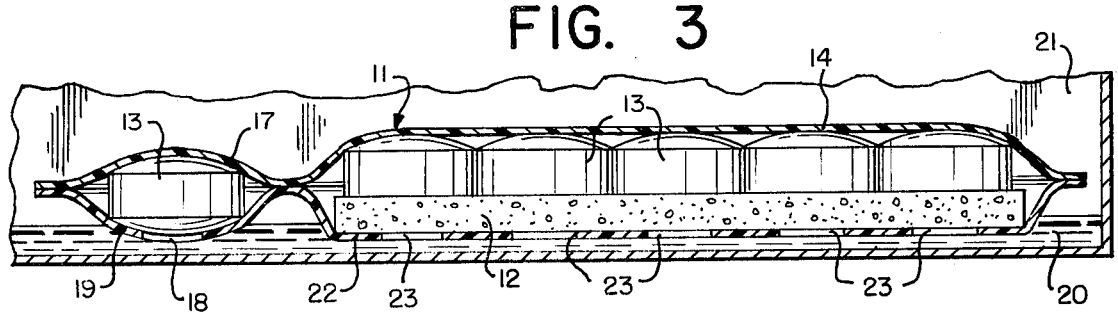
FIG. 3 is a longitudinal cross-sectional view of a modified form of chemical dispenser apparatus in accordance with this invention.
Figure 4:
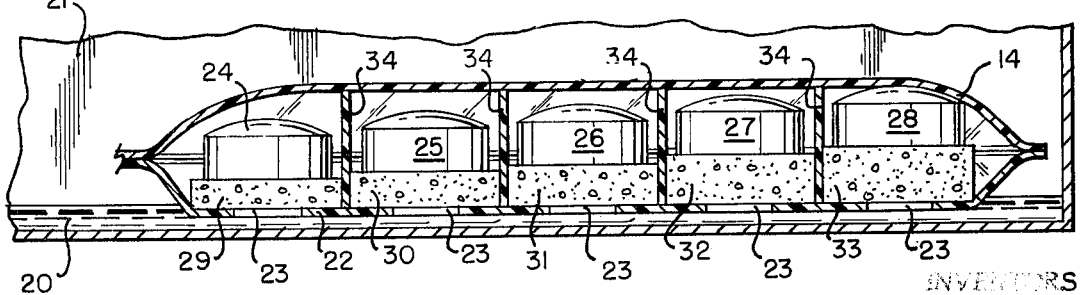
FIG. 4 is a longitudinal cross-sectional view of a further modification of a chemical dispenser apparatus in accordance with this invention.

Referring now to FIG. 3, an alternative embodiment of chemical feeder apparatus 11 is illustrated in which housing 14 forms an envelope surrounding capillary matrix 12 and fluid-treatment composition 13. The floor 22 of housing 14, which may be integrally formed therewith, contains several perforation 23 through which the fluid 20 can pass to reach capillary matrix 12. Once the fluid 20 has contacted capillary matrix 12, it is drawn up by capillary action to wet the fluid-treatment chemical composition 13 resting on the upper surface 16 of capillary matrix 12.

Once a portion of the fluid-treatment chemical composition 13 has been wetted and dissolved by fluid 20, it will diffuse down through capillary matrix 12 and enter the mainstream of fluid 20 through the holes or pores 23. This embodiment of the chemical dispenser apparatus allows for a somewhat slower release of the fluid-treatment composition into fluid 20 since a portion of the lower surface 15 of capillary matrix 12 is covered by floor 22 and the dissolved fluid-treatment chemical composition can enter the fluid 20 only via the holes or pores 23.

Figure 2:
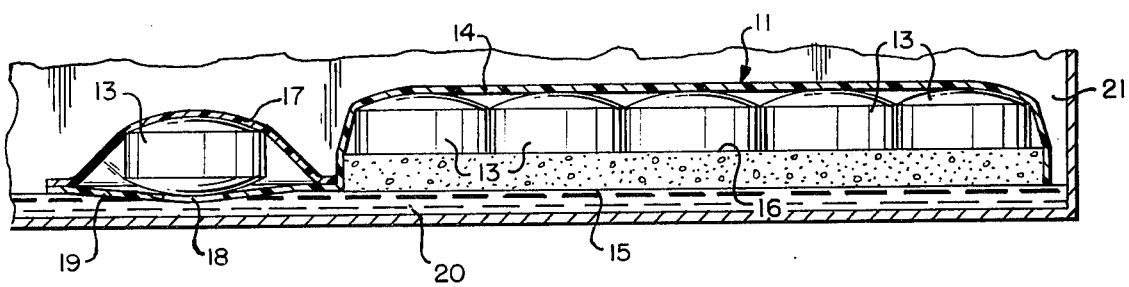
FIG. 2 is a longitudinal cross-sectional view of the chemical dispenser apparatus of FIG. 1.

Referring now to FIG. 2, an alternative embodiment of the invention useful for metering a plurality of different fluid-treatment chemical compositions at varying rates is illustrated. In this embodiment, tablets 24 through 28 represent different fluid-treatment compositions; for example, tablet 24 may be a deodorant, tablet 25 may be a corrosion inhibitor, etc. Each tablet rests on a separate capillary matrix having its own thickness, which may differ from that of others. For example, capillary matrix 29 supporting tablet 24 is shown as having the smallest thickness and will therefore permit fluid 20 to reach tablet 24 in less time than will be required for fluid 20 to reach tablet 25 through the thicker capillary matrix 30 on which that tablet rests. Similarly, capillary matrices 31 through 33 have individual and possibly differing predetermined thicknesses which determine the speed with which fluid 20 will reach tablets 26 through 28. In addition, the rate at which the various tablets 24 through 28 will dissolve can be predetermined by regulating their composition to control their solubility in fluid 20.

Partition walls 34 integrally formed of the same material as housing 14 serve to separate the respective matrices and tablets into individual compartments. Fluid 20 reaches the matrix upon which each tablet rests via suitable holes or apertures 23 in the floor 22 of each compartment. Similarly, the dissolved fluid-treatment chemical compositions of tablets 24 through 28 reach the main fluid body 20 via the holes 23.

This embodiment of the invention may also be used when it is desired to treat a variety of different fluids which may be present at different times in the same pan or tank 21. For example, tablet 24 may be soluble only in an aqueous solution, i.e., water, and tablets 25 through 28 may be soluble only in a non-aqueous solution, such as gasoline. Using the illustrated chemical dispenser apparatus, these compositions having differing solubilities may be simultaneously or independently accurately metered when required into the surrounding fluid.

FIG. 5 illustrates a further embodiment of the invention suitable for metering two different fluid-treatment chemical compositions sequentially into a fluid 20. The chemical dispenser apparatus is similar to that disclosed in FIG. 3 except that a second layer of capillary matrix material 35 is located on top of the initial fluid-treatment chemical composition 13. Matrix layer 35 carries a second fluid-treatment chemical composition 36 on its upper surface. Fluid-treatment chemical composition 13 will be dissolved and exhausted first by fluid 20. Chemical composition 36 will then begin to be dissolved by fluid 20 which will migrate upwards through capillary matrices 12 and 36. These matrices will be contacting each other as they are no longer separated by fluid-treatment chemical composition 13 which has dissolved. The solubility of chemical composition 36 in fluid 20 is selected or adjusted to compensate for the fact that it must diffuse down through a double tier of capillary matrices (i.e., 36 and 12) to reach the main body of fluid 20. The chemical dispenser apparatus illustrated in FIG. 5 may also include a separate sealed compartment 17 carrying a portion of the fluid-treating chemical composition 13 resting above an aperture 18 to provide an immediate initial chemical treatment upon insertion of the chemical dispenser apparatus into the pan 21 containing fluid 20.

FIG. 6 illustrates a chemical dispenser apparatus similar to that illustrated in FIG. 3 with the addition of a flotation collar 37 as an integral part of housing 14. this embodiment of the invention is designed for applications where the fluid to be treated has a depth substantially greater than the height of capillary matrix 12. Flotation collar 37 ensures that chemical dispenser apparatus 11 will remain at the surface of the fluid to be treated, thereby reducing the possibility of inadvertent flooding of housing 14. Flotation collar 37 may be a sealed tube depending on air for buoyance, or the collar may be fabricated of a buoyant material such as styrofoam; the particular flotation material being selected to be non-reactive with the fluid in which the chemical dispenser apparatus is to be used.

FIG. 7 illustrates a chemical dispenser apparatus designed for installation in the evaporation coil system of a conventional room air conditioning unit. This embodiment of the invention includes a folded sheath 40. The sheath 40 is generally fabricated of the same material as housing 14, in this instance flexible polyethylene, and is fastened to the housing 14 or the capillary matrix 12 by means of sewing, adhesives, grommets or any other technique such as heat sealing which secure the sheath in a fixed position at an edge of the chemical dispenser apparatus. An open portion 42 formed between the overlapping sides of the sheath is unobstructed along the full length of the sheath. A hanger device 44 preferably formed of wire or any similar bendable material and including a straight portion 46, is held in the open portion 42 against the inner walls of sheath 40.

Referring to FIG. 8 which illustrates the reverse side of the chemical apparatus of FIG. 7, it will be seen that the capillary matrix 12 forms the entire surface of one side of the chemical feeder apparatus. As illustrated in FIG. 8, the capillary matrix 12, in this instance formed of reticulated polyurethane foam, is joined to housing 14 by heat sealing along marginal seams 50. The housing 14 may also be secured to the capillary matrix 13 with an adhesive, by sewing, or from amongst other well known means for fastening whose selection is dependent upon the particular materials employed in the construction of housing 14 and capillary matrix 13.

In FIG. 9 is illustrated a conventional room air conditioning unit of the type designed for mounting in a window and generally used in residential and commercial installations. A portion of the front panel grille 52 and air filter 54 have been cut away to illustrate the manner of locating and installing the chemical feeder apparatus of this invention. As can be seen with reference to FIG. 10 the chemical feeder apparatus of this embodiment of the invention is suspended from the fins of the air conditioner coil system by inserting hooks 48 between the fins such that the capillary matrix 13 is in direct contact with the evaporator fin structure 56 of the air conditioner. The hooks 48 are positioned on a segment of the refrigeration coil 58 which passes through the evaporator fin structure of the air conditioner. The chemical treatment composition tablets 13 are wet by moisture which condenses on the coil and fins of the air conditioner 50 and is thereafter drawn through the capillary matrix 13 by capillary action. The resulting chemical treatment solution generally is metered onto fins 56 and a portion of the solution is metered downward from the lower edge 60 of the capillary matrix. Additional condensed moisture seeping downward from the coil 58 and fin structures 56 washes the chemical treatment solution into a collection pan located at the base of the evaporator fin structure in the air conditioner. This base pan serves as a collection point where generalized treatment of the accumulated condensed moisture is also affected.

The materials of which the housing and the flotation collar are fabricated, as well as that of the capillary matrix are selected for a particular chemical dispenser apparatus, based upon the particular application in which the chemical dispenser is intended to be used. Generally, the housing and capillary matrix materials selected for a particular construction are those which will not dissolve or enter into any adverse chemical reation with the fluid to be treated or with the treating chemical.

A particular advantage of the chemical dispenser devices of this invention is that they do not require any fixed minimum fluid level to begin metering the respective fluid treatment compositions. For example, the chemical dispenser apparatus illustrated in FIG. 2 when used in treating condensate water in a fan coil air conditioner will treat accumulations of moisture as small as a few droplets, while it is also capable of treating far larger accumulations of moisture should they occur. Despite the variation in the amount of fluid to be treated, the ratio of fluid-treatment chemical composition dispensed will always remain in relatively constant proportion to the amount of fluid contacting and migrating upward through capillary matrix 12, since the capillary activity of the matrix material, and the solubility of the chemical composition will remain as a constant factor.

The chemical dispenser devices of this invention may be economically manufactured, require a minimum of installation space, are easily set up for operation by simple insertion into the system to be treated, and require no maintenance once they are placed in operation.

Further, the chemical dispenser devices of this invention are suitable for treating both aqueous and non-aqueous solutions, may be used in both recirculating and once-through fluid systems, and are advantageously employed in both high fluid flow and extremely low fluid flow systems.

The chemical dispensers of this invention are particularly suited for treating the condensate water in fan coil air conditioning units, and may also be employed to treat non-recirculating humidifier fluids, drain and sewage system effluents, recirculating steam boiler systems, fuel oil systems, fountains, pools, fish tanks or the like. The devices of this invention are economically designed to meter a preselected amount of fluid-treatment chemical composition into a desired fluid by preselecting the solubility of the fluid-treatment chemical composition, in relation to inter alia the capillary activity of the capillary matrix material and its thickness.

It will also be noted that the housing of this invention may serve to hold the dissolvable chemical composition in place on one surface of the capillary matrix as well as preventing incidental dripping or splashing action from wetting the dissolvable chemical composition from the top or sides.

It will be understood that the chemical dispenser apparatus of this invention can be further modified to include several tiers of capillary matrices with corresponding intermediate chemical compositions.

It will be seen that the instant invention provides an economical, accurate and easy-to-use (chemical dispensing) apparatus for use in dispensing a fluid-treatment chemical composition into a variety of fluid systems.

What is claimed is:

1. A chemical dispenser apparatus comprising a porous plastic capillary matrix exhibiting capillary action towards a fluid when a surface area of said matrix is contacted by said fluid, a dissolvable chemical composition resting on an upper surface of said matrix, and housing means comprising a fluid impermeable flexible plastic envelope above said matrix and said chemical composition, a peripheral edge portion of said envelope secured to the outer edges of said capillary matrix, and said chemical composition being held between said housing and the upper surface of said capillary matrix.

2. A chemical dispenser as recited in claim 1 wherein the capillary matrix comprises a material which will not decompose when in contact with said fluid.

3. A chemical dispenser as recited in claim 2 wherein the capillary matrix comprises a reticulated plastic foam material.

4. A chemical dispenser apparatus as recited in claim 3 further including a second capillary matrix resting on said chemical composition and a second chemical composition resting on said second capillary matrix and beneath a portion of said housing means.

5. A chemical dispenser apparatus as recited in claim 3 further including a flotation collar integrally formed with said housing means.

6. A chemical dispenser apparatus as recited in claim 4 wherein said capillary matrix comprises a porous polyurethane foam composition.

7. A chemical dispenser apparatus comprising at least one porous capillary matrix exhibiting capillary action when a surface area of said matrix is brought into contact with a fluid, a plurality of solid form fluid treatment chemicals containing an algaecide composition resting on an upper surface of said matrix, said chemicals being dissolvable in said fluid and an envelope comprised of a fluid impermeable plastic material and said capillary matrix, said envelope containing said solid form fluid treatment chemicals.

8. A chemical dispenser apparatus as recited in claim 7 further including means for positioning said capillary matrix on the evaporator fin structure of a room air conditioner, said means being fastened to one side of said envelope.

9. A chemical dispenser apparatus as recited in claim 8 wherein said means for positioning said capillary matrix on the evaporator fin structure of a room air conditioner comprises a sheath having an open central portion formed between the overlapping sides of said sheath and fastened to one edge of said envelope, and a hanger device held between the inner walls of said sheath.

10. A chemical dispenser apparatus as recited in claim 9 wherein said hanger is a flexible wire construction and said capillary matrix is secured directly to said envelope with an adhesive composition.

11. A chemical dispenser apparatus comprising a flexible capillary matrix exhibiting capillary action when a first surface area of said matrix is contacted by a fluid, a dissolvable chemical composition positioned on an upper surface of said matrix, and a flexible fluid impermeable housing covering said chemical composition and said upper matrix surface, and said chemical composition being held in a pocket formed between said upper matrix surface and the lower surface of said housing.

12. A chemical dispenser apparatus as recited in claim 1 wherein said housing is formed of a plastic sheet material joined together along the peripheral edges of said matrix.

13. A chemical dispenser apparatus as recited in claim 12 wherein an area of said housing beneath said matrix has a plurality of apertures, each of said apertures permitting direct fluid contact between a corresponding portion of said matrix and an external fluid medium.

14. A chemical dispenser apparatus as recited in claim 13 further including means for positioning said capillary matrix on the evaporator fin structure of an air conditioner.

15. A chemical dispenser apparatus as recited in claim 14 wherein said means for positioning said capillary matrix on the evaporator fin structure of an air conditioner comprises a sheath having an open central portion formed between overlapping sides and fastened to one edge of said housing, and a hanger device held between the inner walls of said sheath.

* * * * *